Figures 1, 2, 3, 4:
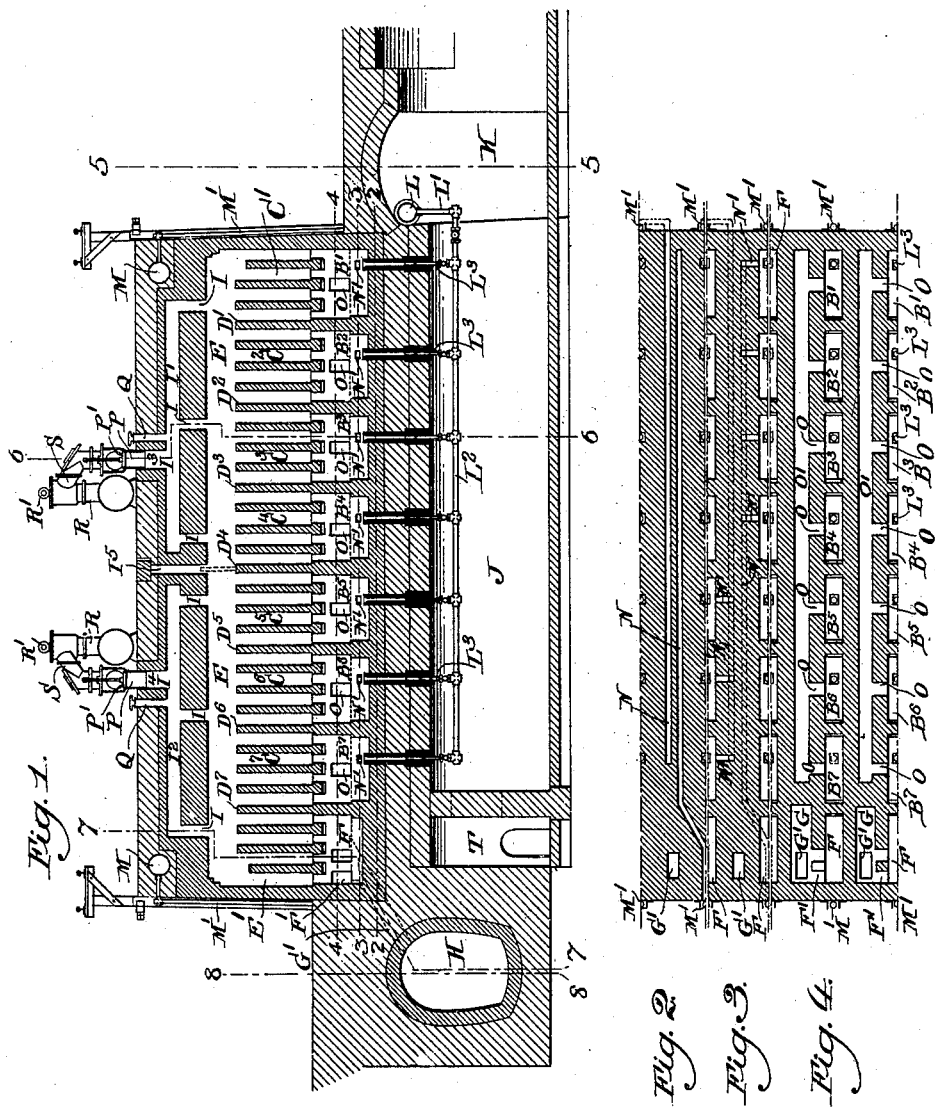

No. 649,450. Patented May 15, 1900.
G. HILGENSTOCK.
COKE OVEN.
(Application filed Oct. 14, 1897.)
(No Model.) 2 Sheets—Sheet 1.

Witnesses. Inventor.
Gustav Hilgenstock
by
his Attorney.

No. 649,450. Patented May 15, 1900.
G. HILGENSTOCK.
COKE OVEN.
(Application filed Oct. 14, 1897.)
(No Model.) 2 Sheets—Sheet 2.
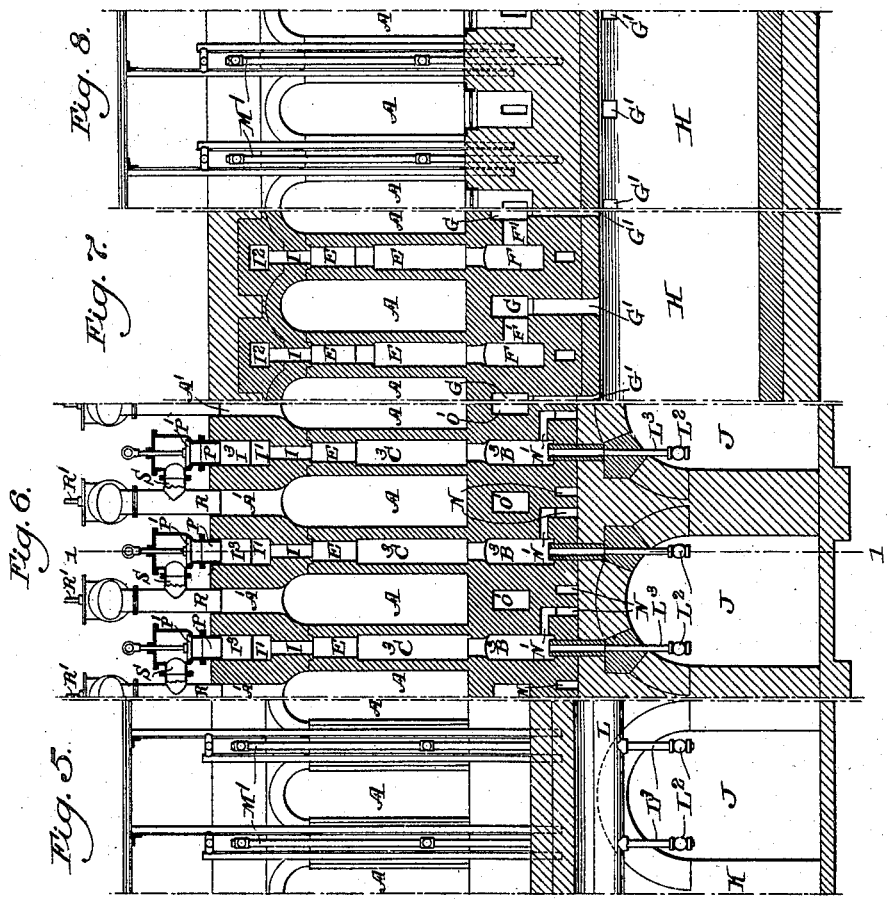
Witnesses.
Inventor.

UNITED STATES PATENT OFFICE.

GUSTAV HILGENSTOCK, OF DAHLHAUSEN-ON-THE-RUHR, GERMANY, ASSIGNOR TO THE UNITED COKE AND GAS COMPANY, OF CHARLESTON, WEST VIRGINIA, AND PHILADELPHIA, PENNSYLVANIA.

COKE-OVEN.

SPECIFICATION forming part of Letters Patent No. 649,450, dated May 15, 1900.

Application filed October 14, 1897. Serial No. 655,100. (No model.)

*To all whom it may concern:*

Be it known that I, GUSTAV HILGENSTOCK, a subject of the King of Prussia, Emperor of Germany, and a resident of Dahlhausen-on-the-Ruhr, Westphalia, Kingdom of Prussia, Germany, have invented a certain new and useful Improvement in Coke-Ovens, (for which I have obtained German Letters Patent No. 88,200, filed December 8, 1895, and issued August 27, 1896,) of which the following is a true and exact description, reference being had to the accompanying drawings, which form a part thereof.

My invention relates to the construction of horizontal externally-heated coke-ovens adapted for saving by-products, and has for its object to provide a better system and arrangement for heating such ovens.

The nature of my improvements will be best understood as described in connection with the drawings, in which they are illustrated, and in which—

Figure 1 is a vertical longitudinal section taken through the heating-flue between two ovens, as on the line 1 1 of Fig. 6. Fig. 2 is a horizontal section on the line 6 6 of Fig. 1; Fig. 3, a horizontal section on the line 7 7 of Fig. 1; Fig. 4, a horizontal section on the line 8 8 of Fig. 1. Fig. 5 is a front view, partly in section, on the line 2 2 of Fig. 1. Fig. 6 is a vertical cross-section on the line 3 3 of Fig. 1. Fig. 7 is a vertical cross-section on the line 4 4 of Fig. 1. Fig. 8 is a rear view, partly in section, on the line 5 5 of Fig. 1.

A A A, &c., indicate the coke-ovens, having, as shown, openings at A' for the outward passage of gas. Situated between and extending both above and below the top and bottom of the coke-ovens are horizontal flues, the lower portions of which are divided by vertical walls D, D', $D^2$, $D^3$, $D^4$, $D^5$, $D^6$, and $D^7$, Fig. 1, into separate combustion-chambers B' to $B^7$, the upper portions of said chambers being by means of vertical partitions divided into divisional flues, as indicated at C' to $C^7$, all of said flues opening at top into a common flue E, which at one end of the horizontal chamber opens into a downtake E', (shown as divided into separate flues by vertical partitions,) and thence into a chamber F, from which a lateral passage F' leads into a chamber G, from which in turn leads an inclined flue G', which enters the common take-off flue H. As shown, the upper portion of the horizontal flue above the flue-passage E is divided by horizontal walls into a number of vertical passages I, these at one end of the structure opening into a horizontal flue I' and those at the other end of the structure opening into a horizontal flue $I^2$, said flues I' and $I^2$ opening in turn through passages $I^3$ and $I^4$ into conduits P, which by connecting-pipes S, Fig. 6, open into conduits R, which connect through passages A' with the ovens. Valves, as indicated at P' and R', are arranged, the valve P' to close or open the conduit P and the valve R' to close or open the connection of the conduit R with the gas-mains, into which the gases from the ovens are passed when it is desired to save them. It will readily be seen that by properly manipulating these valves the gases from the oven can be turned into the flues I' and $I^2$, from which they will pass down into the various divisions of the horizontal heating-flue.

J J, &c., indicate a series of parallel tunnels constructed in the foundation of the ovens and of sufficient size to permit the passage of a man. They are properly made, as shown, parallel with the ovens and one for each two ovens.

K, Fig. 1, is a connecting-tunnel, into which the tunnels J open.

L indicates a gas-main extending through the tunnel K and having connecting-pipes L', through which gases pass to a series of horizontal gas-pipes $L^2$, of which two are situated in each tunnel J and from which burner-pipes $L^3$ lead to each of the combustion-chambers B' to $B^7$, entering said combustion-chambers at the bottom, as shown.

Air may be drawn in from the tunnels J by the injector-like action of the gas escaping into the combustion-chambers, or the combustion-chambers can be supplied with air to support combustion in any convenient way. I have shown air-mains M M, Fig. 1, built in the masonry at the top of the ovens, where they will receive considerable heat from the hot masonry, said air-mains connecting with air-pipes M', which in turn connect with and supply air-flues N N, Fig. 6, &c., situated in the masonry beneath the ovens and connecting, as indicated at N', with the combustion-chambers B' to B⁷. It is obvious that the air supplied by this construction will be quite highly heated before entering the combustion-chambers.

O O O, Fig. 1, &c., indicate flue-passages leading from each of the combustion-chambers B' to B⁷ into flues O', which in turn may connect in any convenient way (none being indicated) with a take-off flue H.

The use of the flues O and O', Fig. 1, is to provide an exit for gases at the bottom of each combustion-chamber when it is desired to heat the ovens by gases drawn in from the top, as through the passages I³ and I⁴. When so used, air is permitted to enter with the gases, as through passages Q Q.

It will readily be seen that by my system of vertical combustion-chambers, situated side by side and extending substantially throughout the length of the heating-flues between the ovens, each being independently supplied with gas, I am enabled to nicely regulate the temperature of all parts of the oven. Moreover, this system permits the heating of the lower parts of the oven to the higher degree, which is desirable, and enables me to regulate not only the temperature, but the pressure, upon all parts of the oven-walls, whereby I am enabled to prevent to a greater extent than heretofore either the passage of heating-gas and products of combustion into the ovens or the loss of oven-gas by its passage from the ovens into the heating-flues.

The arrangement of the tunnel system beneath the ovens not only places the gas-mains and supply-pipes where they are not exposed to injury, but permits of the easy regulation of the gas-supply to each and every combustion-chamber and is, in fact, a most important feature of the construction illustrated.

The construction by which I am enabled to couple the gas take-offs A' R with the heating-flues is advantageous not only as enabling me to use oven-gas for heating the flues, but also as affording means for sucking the gas and smoke out of the ovens when they are opened for charging or discharging, thus protecting the workmen.

Having now described my invention, what I claim as new, and desire to secure by Letters Patent, is—

1. In combination with a series of horizontal externally-heated coke-ovens arranged side by side and having heating-flues arranged in their partition-walls and discharging-openings at their ends, a series of parallel tunnels of size sufficient to permit the passage of a man arranged beneath the ovens and heating-flues and parallel with the ovens, gas-conduits as L² running through and accessibly situated in said tunnels and a series of burner-pipes extending from different points along the length of each of said conduits L² into the heating-flues aforesaid.

2. In combination with a series of horizontal externally-heated coke-ovens having heating-flues arranged in their walls, a series of vertical partition-walls as D' D² D³, &c., separating the lower portion of said flues into separate combustion-chambers extending substantially from front to rear of the ovens and a series of gas and air conduits entering the bottoms of said chambers and supplying each.

3. In combination with a series of horizontal externally-heated coke-ovens having heating-flues arranged in their walls, a series of vertical partition-walls as D' D² D³, &c., separating the lower portion of said flues into separate combustion-chambers extending substantially from front to rear of the ovens, a series of parallel tunnels of size sufficient to permit the passage of a man arranged beneath and parallel with the ovens, gas-conduits as L² accessibly situated in said tunnels and a series of burner-pipes extending from each of said conduits L² into each combustion-chamber.

GUSTAV HILGENSTOCK.

Witnesses:
CARL ARZT,
ENNER RENZEN.